J. McA. LONG.
MEANS FOR MAKING ICE CREAM.
APPLICATION FILED JULY 9, 1921.
1,417,847.
Patented May 30, 1922.
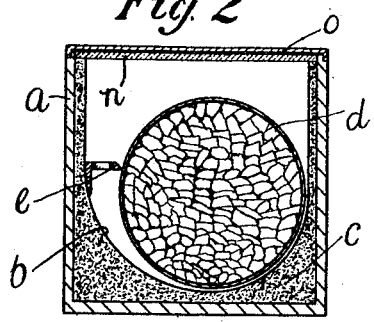
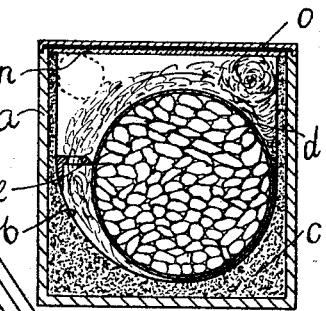
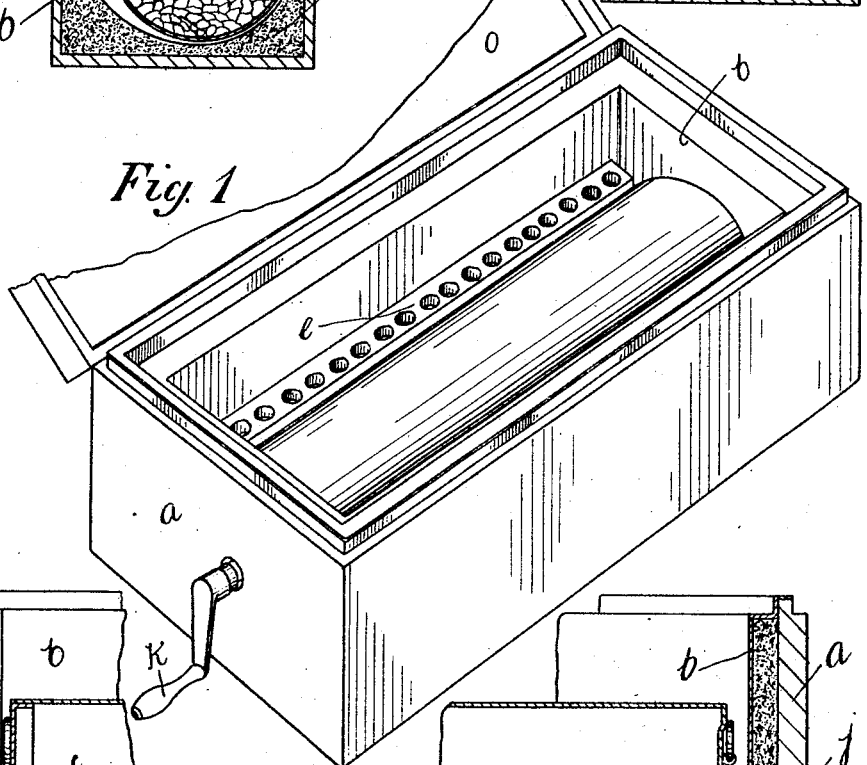
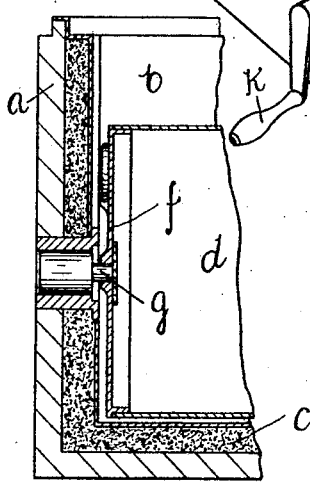
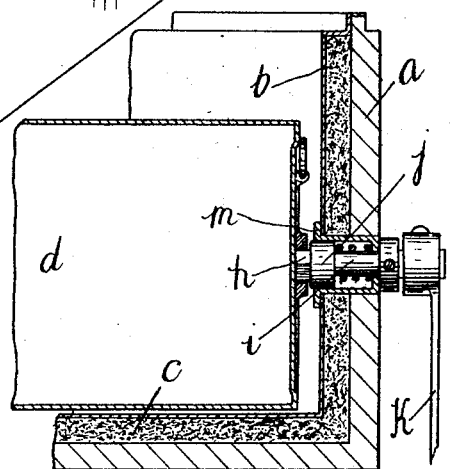

UNITED STATES PATENT OFFICE.

JOHN McAULIFFE LONG, OF MANCHESTER, ENGLAND.

MEANS FOR MAKING ICE CREAM.

1,417,847.          Specification of Letters Patent.     Patented May 30, 1922.

Application filed July 9, 1921. Serial No. 483,640.

*To all whom it may concern:*

Be it known that I, JOHN McAULIFFE LONG, subject of the King of Great Britain, and residing at Guildhall Chambers, Lloyd Street, Manchester, England, have invented new and useful Improvements in Means for Making Ice Cream, of which the following is a specification.

This invention comprises improvements in means for making ice cream and similar frozen or partially frozen foodstuffs.

The most general method of making "ice cream" and the like at present in use is to place the cream in a receptacle which is surrounded by a freezing mixture, such as ice and salt, and to stir the substance during the freezing process by hand or by driven paddles or beaters. This method is slow and means heavy work.

Another method is to rotate a drum or cylinder containing the freezing mixture, with the drum surface dipping into a receptacle for the cream, so that it takes up a relatively thin layer and rapidly freezes it. In this case a scraper rests or is pressed against the drum or cylinder to remove the frozen cream from the drum and deliver it outside the apparatus. This method is not suitable for making more than a small amount of ice cream, as whilst it is very rapid in freezing a small quantity, it has the disadvantage that the frozen cream delivered in this way into an outside receptacle, tends to melt rapidly; and it has also the further disadvantage of a very unequal freezing of the cream so that the finished product is not smooth and of the same consistency all through.

Both the above described methods are liable to this defect, in fact.

In my invention I arrange for the whole of the substance to be treated (e. g. cream) to be thoroughly and constantly worked during the freezing process, so that a perfectly smooth and consistent product is the result, and I arrange for the whole of the cream to pass over and around the contour of the container for the freezing mixture so as to get the more rapid action for the whole body, which was aimed at in the rotating drum method by a "partial" treatment.

I am thus able to obtain a smooth high quality product in a very short space of time.

Further, the product is not delivered out of the apparatus as it is made, as in other drum type machines, but may be left in the apparatus for a considerable time and will retain its condition so that after making, it may be stored until required for use.

An example of a suitable apparatus for carrying out the invention is shown in the appended drawings.

Figure 1, is a perspective view of the apparatus with the lid or cover raised.

Figure 2, is a transverse section.

Figure 3, is a similar view to Figure 2 showing the apparatus in use.

Figure 4, is a longitudinal section to show one convenient arrangement for mounting and rotating the cylinder.

In this constructional example $a$ is a box having an inner trough-shaped lining $b$, and any suitable heat insulating material such as cork or the like, indicated by $c$, in the spaces between the box and the lining. The lining $b$, which is preferably metallic is of trough shape in cross section and mounted within it is a hollow cylinder $d$ to contain the freezing mixture. The cylinder is arranged toward one side of the trough-shaped lining $b$ so as to leave a relatively large space along one side between the cylinder and the lining. In this space at a suitable height is arranged a grid or baffle $e$ which at one edge is preferably in light contact along the contour of the cylinder or is closely adjacent to it. The edge of the grid or baffle $e$ adjacent the cylinder is preferably continuous, but otherwise the grid is of perforated or any suitable skeleton formation. At least one end of the cylinder is removable for charging it with freezing mixture, and both ends are arranged for cooperating with means in the box, so that the cylinder is free to turn, and is connected to a means for turning it. There is no novelty in a rotatable cylindrical container for containing a freezing mixture, and the method of closing the cylinder and mounting it forms no part of my claim, and may follow on any approved lines. I have shown a removable end to the cylinder at $f$, and at one end of the box a trunnion peg $g$ on which the end of the cylinder is free to turn, and at the other a square or key part $h$ projecting from a spindle $i$, with a closure collar $j$ working in a sleeve in the box. The spindle $i$, is rotated by means of a handle $k$ and is axially movable against a spring $m$, so that it may be drawn back to permit removal of the cylinder.

Power may be employed to rotate the cylinder in large sizes of apparatus.

The lining $b$ is arranged to leave a considerable space above the cylinder and I prefer to close the top by a removable plate of glass $n$, above which is the lid $c$ of suitable depth, and containing insulating material. In use the cream is poured into the apparatus after the cylinder has been charged with freezing mixture, and the cylinder is rotated to cause the whole body of cream to be worked around in the lining $b$.

As there is comparatively little space between the cylinder and the lining, and the lining follows the contour of the cylinder, this effect is readily attained. The cream fills the space beneath the grid or baffle $e$ and is caused to pass through the openings therein, and then flows over the cylinder in complete contact with the walls of same. The repetition of this action works the cream most thoroughly as it rapidly cools and freezes, and gives the desired result.

With the illustrated apparatus in action the cream as it thickens during freezing, due to the friction against the lining on the side opposite the grid $e$ forms a roll as indicated in Figure 3, which can be transferred in the other side when the cream is ready for use, by reversing the cylinder, and can then be bodily removed by a suitable bent plate or instrument. The reverse rotation of the cylinder brings up practically all the cream into a position for removal.

It will be understood that considerable modification in the particular constructional form of apparatus is possible, whilst still embodying the spirit of my invention.

I claim:—

1. In a freezing machine, a vessel for holding the material to be frozen having a curved trough-shaped lower part, a revoluble cylinder for holding the freezing material journaled in the said chamber and arranged with its periphery adjacent to one side of the upper part of the said curved lower part, an angular space being formed between the cylinder and the remainder of the curved lower part, and a scraper secured in the upper part of the said angular space.

2. In a freezing machine, a vessel for holding the material to be frozen having a curved trough-shaped lower part, a revoluble cylinder for holding the freezing material journaled adjacent to and substantially concentric with one side portion of the said curved lower part, a downwardly and rearwardly converging space being formed between the remainder of the curved lower part and the cylinder, and a scraper secured in the upper part of the said space.

3. In a freezing machine, a vessel for holding the substance to be frozen having a curved trough-shaped lower part, a revoluble cylinder for holding the freezing substance journaled in the said chamber and arranged with its periphery adjacent to one side of the upper part of the said curved lower part, an angular space being formed between the cylinder and the remainder of the curved lower part, and a perforated scraper secured in the upper part of the said angular space so that the substance to be treated is caused to be propelled around and around in the chamber and caused to pass through the perforation of the scraper into the space above the scraper and cylinder.

In testimony whereof I affix my signature in presence of two witnesses.

JOHN McAULIFFE LONG.

Witnesses:
WM. HY. SYKES,
NELLIE MILLINGTON.